US012579418B2

(12) United States Patent
Kim et al.

(10) Patent No.: US 12,579,418 B2
(45) Date of Patent: Mar. 17, 2026

(54) CROSSBAR-BASED NEUROMORPHIC COMPUTING APPARATUS CAPABLE OF PROCESSING LARGE INPUT NEURONS AND METHOD USING THE SAME

(71) Applicant: ELECTRONICS AND TELECOMMUNICATIONS RESEARCH INSTITUTE, Daejeon (KR)

(72) Inventors: Yongjoo Kim, Sejong-si (KR); Eunji Pak, Daejeon (KR); Youngmok Ha, Daejeon (KR); Taeho Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 660 days.

(21) Appl. No.: 18/077,099

(22) Filed: Dec. 7, 2022

(65) Prior Publication Data

US 2023/0206048 A1 Jun. 29, 2023

(30) Foreign Application Priority Data

Dec. 29, 2021 (KR) ........................ 10-2021-0191790

(51) Int. Cl.
*G06N 3/06* (2006.01)
*G06N 3/04* (2023.01)
(Continued)

(52) U.S. Cl.
CPC ............. *G06N 3/063* (2013.01); *G06N 3/049* (2013.01)

(58) Field of Classification Search
CPC .......... G06N 3/06; G06N 3/063; G06N 3/065; G06N 3/067; G06N 3/0675; G06N 3/049;
(Continued)

(56) References Cited

U.S. PATENT DOCUMENTS 3,239,689 A * 3/1966 Winder .................. G11C 15/04
326/82
11,188,816 B2 * 11/2021 Kim ...................... G06N 3/063
(Continued)

FOREIGN PATENT DOCUMENTS

KR 10-2014-0132787 11/2014
KR 10-2020-0026626 3/2020
(Continued)

OTHER PUBLICATIONS

Moscibroda et al., "A Case for Bufferless Routing in On-Chip Networks", Jun. 24, 2009, ISCA 2009, pp. 196-207. (Year: 2009).*
(Continued)

*Primary Examiner* — Paulinho E Smith
(74) *Attorney, Agent, or Firm* — KILE PARK REED & HOUTTEMAN PLLC

(57) ABSTRACT

A neuromorphic computing method includes comparing a maximum number of axons in which a size of a crossbar of a hardware-based node is considered with a number of input neurons, when the number of input neurons exceeds the maximum number of axons, grouping some of input neurons in consideration of the maximum number of axons, obtaining a spike output for a generated group, and inputting the spike output, together with remaining input neurons that are not included in the group, to any one node, and then processing the spike output.

10 Claims, 8 Drawing Sheets

(51) Int. Cl.
  *G06N 3/049* (2023.01)
  *G06N 3/063* (2023.01)
(58) Field of Classification Search
  CPC .. G06N 3/02; G06N 3/04; G06N 7/00; G06N
    7/04; G06N 7/043; G06N 7/046
  See application file for complete search history.

(56) References Cited

U.S. PATENT DOCUMENTS

| | | | | |
|---|---|---|---|---|
| 2005/0058149 | A1* | 3/2005 | Howe | H04L 47/17 |
| | | | | 370/428 |
| 2016/0283840 | A1* | 9/2016 | Amir | G06N 3/082 |
| 2016/0321537 | A1* | 11/2016 | Akopyan | G06N 3/063 |
| 2016/0335535 | A1* | 11/2016 | Amir | G06N 3/063 |
| 2018/0211165 | A1* | 7/2018 | Oh | H03K 3/017 |
| 2019/0080229 | A1 | 3/2019 | Modha | |
| 2019/0213472 | A1* | 7/2019 | Park | G06N 3/088 |
| 2020/0184315 | A1* | 6/2020 | Kim | G06N 3/02 |
| 2021/0406694 | A1* | 12/2021 | Kim | G06N 3/088 |
| 2022/0076108 | A1* | 3/2022 | Park | H10D 30/00 |
| 2023/0206048 | A1* | 6/2023 | Kim | G06N 3/049 |
| | | | | 706/33 |

FOREIGN PATENT DOCUMENTS

| | | |
|---|---|---|
| KR | 10-2020-0069901 | 6/2020 |
| KR | 10-2020-0076542 | 6/2020 |
| KR | 10-2021-0158697 | 12/2021 |

OTHER PUBLICATIONS

Kim et al., "A Neural Network Decomposition Algorithm for Mapping on Crossbar-Based Computing Systems," Electronics, Sep. 18, 2020, pp. 1-10, vol. 9.

* cited by examiner

N NEURONS

CROSSBAR-BASED NEUROMORPHIC COMPUTING APPARATUS CAPABLE OF PROCESSING LARGE INPUT NEURONS AND METHOD USING THE SAME

CROSS REFERENCE TO RELATED APPLICATION

This application claims the benefit of Korean Patent Application No. 10-2021-0191790, filed Dec. 29, 2021, which is hereby incorporated by reference in its entirety into this application.

BACKGROUND OF THE INVENTION

1. Technical Field

The present disclosure relates generally to crossbar-based neuromorphic computing technology capable of processing large input neurons, and more particularly to technology for configuring neuromorphic hardware and software in artificial intelligent fields.

2. Description of the Related Art

Artificial Intelligence (AI) into which a lot of research has been currently conducted may be subdivided into weak artificial intelligence and strong artificial intelligence. Weak artificial intelligence refers to artificial intelligence in which a given task in one specific field is performed in compliance with a human instruction. A Deep Neural Network (DNN) into which a lot of research has recently been conducted is one scheme of weak artificial intelligence. As a representative research field of strong artificial intelligence, there is neuromorphic computing. Neuromorphic computing is an engineering field in which a circuit for modeling the operating scheme of the brain (correlation between neurons and synapses) in the form of hardware is generated, thus imitating a human brain function. A circuit generated in this way is referred to as a 'neuromorphic circuit', and producing artificial intelligence using the neuromorphic circuit is referred to as 'neuromorphic computing'.

In this scheme, a circuit itself is composed only of neurons and synapses, thus making it possible to configure a high-level artificial intelligence system at lower power in a narrower space compared to an existing machine learning method. That is, machine learning is implemented such that a Central Processing Unit (CPU) or a Graphics Processing Unit (GPU) operates the entire system by abstracting the operation of the brain, whereas neuromorphic computing imitates each of neuronal cells of the brain and operates only a neuron reacting to an input signal, and thus it is expected that power consumption will be much lower than the existing machine learning scheme.

PRIOR ART DOCUMENTS

Patent Documents (Patent Document 1) Korean Patent Application Publication No. 10-2020-0026626, Date of Publication: Mar. 11, 2020 (Title: Neuromorphic Device using Crossbar Memory)

SUMMARY OF THE INVENTION

Accordingly, the present disclosure has been made keeping in mind the above problems occurring in the prior art, and an object of the present disclosure is to provide a neuromorphic hardware configuration, which can output correct results even if an input synapse for a neuron exceeds the size of a crossbar.

Another object of the present disclosure is to process a neural network by associating multiple crossbars of a neuromorphic node, thus overcoming restrictions on existing neuromorphic computing hardware.

A further object of the present disclosure is to process a neuron in which large inputs are generated.

In accordance with an aspect of the present disclosure to accomplish the above objects, there is provided a neuromorphic computing method in a crossbar-based neuromorphic computing system, the neuromorphic computing method including comparing a maximum number of axons in which a size of a crossbar of a hardware-based node is considered with a number of input neurons; when the number of input neurons exceeds the maximum number of axons, grouping some of input neurons in consideration of the maximum number of axons; obtaining a spike output for a generated group; and inputting the spike output, together with remaining input neurons that are not included in the group, to any one node, and then processing the spike output.

The spike output may be transferred to the one node through a bypass path which does not pass through an input buffer or an output buffer in the node.

The spike output may correspond to an intermediate value obtained by processing an input node included in the group in an additional node connected to the one node through a router, and may be transferred to a crossbar of the one node through the router.

The spike output may correspond to a value obtained by summing spikes for respective input neurons included in the group.

The neuromorphic computing method may further include determining the one node and the additional node in consideration of information of each of multiple nodes constituting the neuromorphic computing system.

The group may be generated such that a value obtained by adding a number of remaining input neurons, which are not included in the group, to a number of input neurons included in the group does not exceed the maximum number of axons.

In accordance with another aspect of the present disclosure to accomplish the above objects, there is provided a neuromorphic computing apparatus, including a processor for comparing a maximum number of axons in which a size of a crossbar of a hardware-based node is considered with a number of input neurons, when the number of input neurons exceeds the maximum number of axons, grouping some of input neurons in consideration of the maximum number of axons, obtaining a spike output for a generated group, inputting the spike output, together with remaining input neurons that are not included in the group, to any one node, and then processing the spike output; and memory for storing the input neurons and the spike output.

The spike output may be transferred to the one node through a bypass path which does not pass through an input buffer or an output buffer in the node.

The spike output may correspond to an intermediate value obtained by processing an input node included in the group in an additional node connected to the one node through a router, and may be transferred to a crossbar of the one node through the router.

The spike output may correspond to a value obtained by summing spikes for respective input neurons included in the group.

The processor may determine the one node and the additional node in consideration of information of each of multiple nodes constituting the neuromorphic computing system.

The group may be generated such that a value obtained by adding a number of remaining input neurons, which are not included in the group, to a number of input neurons included in the group does not exceed the maximum number of axons.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
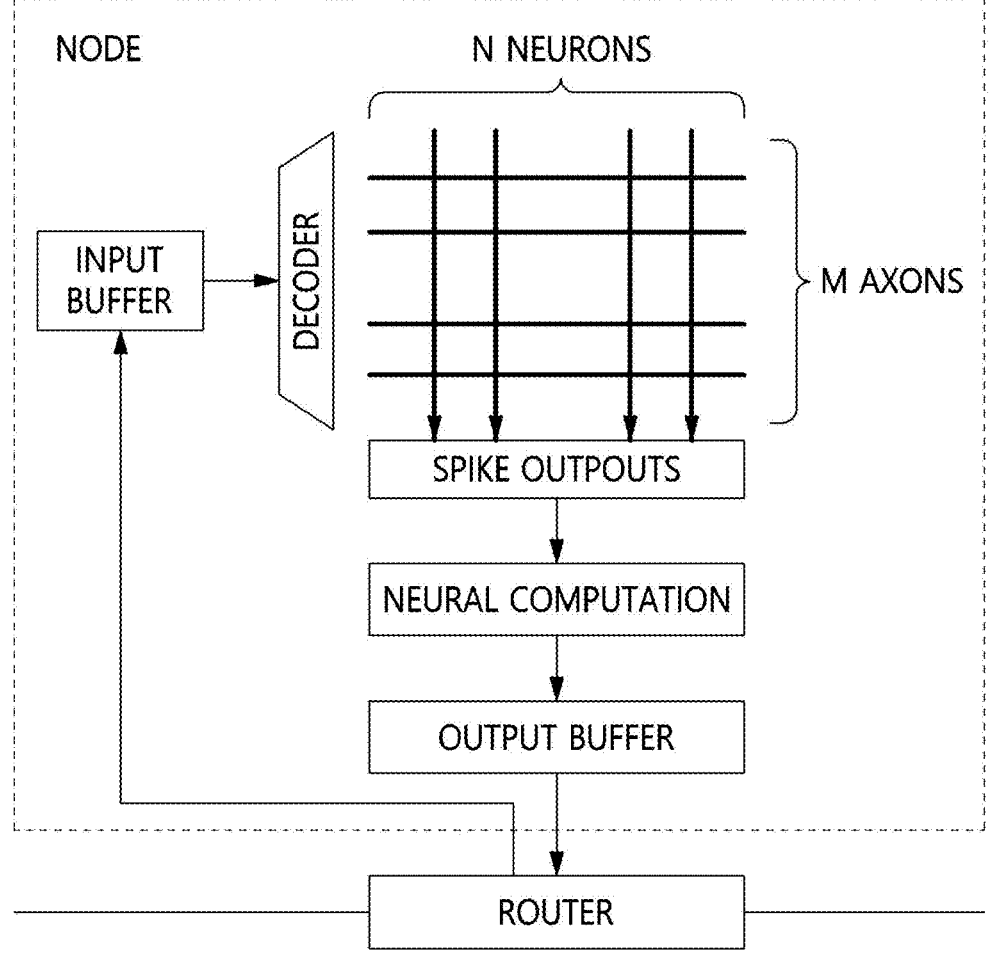
FIG. 1 is a diagram illustrating an example of existing node configuration using a crossbar synapse implementation scheme.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

Hereinafter, embodiments of the present disclosure will be described in detail with reference to the attached drawings.

FIG. 1 is a diagram illustrating an example of existing node configuration using a crossbar synapse implementation scheme.

A neuromorphic computing system has been implemented in various hardware forms by various research teams. Such hardware components are implemented to be efficiently operated from the standpoint of power consumption and performance while imitating a human brain as similar to the human brain as possible.

Among methods of configuring a neuromorphic computing system, into which research has been currently conducted, methods for implementing synapses may be roughly classified into two types.

One type is a method for treating spike transmission through synapses as data communication, thus exchanging data through a bus based on spike transmission.

The other type is a crossbar synapse implementation method which configures hardware in consideration of the principal features of synapses, as illustrated in FIG. 1.

For example, when a neuron fires a spike and transmits the spike to a next neuron, spikes having different strengths are transmitted to respective next neurons depending on the characteristics of synapses through which respective spikes are moving. In order to imitate these transmission characteristics, synapses which are junctions between neurons are implemented using a memory-based crossbar.

In this case, after axons of an input neuron (presynaptic neuron of synapses), are allocated to the horizontal axis of the crossbar, spikes are transmitted through the crossbar, and neurons at which spikes will arrive (postsynaptic neuron of synapses) are allocated to the vertical axis of the crossbar, and thus all synapses are configured. Further, spike strengths that are applied differently to respective synapses may be represented by inserting a memory-based resistor (memristor) into the junctions between the horizontal axis and the vertical axis.

Here, the crossbar used at this time is limited in that the size thereof cannot be physically and infinitely increased. Generally, due to the problem of a decoder size, the problem of leakage current, or the like, a crossbar having a maximum size of 256×256 or less is mainly used.

The problem is that, in the case of a large-scale neural network, the number of synapses applied as input to one neuron is much greater than 256. That is, when the number of spikes input to one neuron exceeds 256, the corresponding neuron cannot be mapped to the crossbar using the existing method.

Further, when a neural network is operated in the neuromorphic computing system, there is a need to divide the neural network into small network units and allocate the small network units to respective resources so that the neural network is desirably operated in neuromorphic hardware in which small computation resources are gathered. For this operation, the neural network is divided into small-sized neural network groups that may be mapped to nodes of a Network-on-Chip (NoC) constituting the neuromorphic system.

The existing method of dividing a neural network into small groups is configured to generate small groups in consideration of only the number of neurons that can be allocated to nodes. However, when a large-scale neural network is used, input applied to one neuron exceeds the maximum number of axons (proportional to the size of the crossbar) that can be allocated to one node, and thus a problem arises in that the input cannot be allocated to the corresponding node.

In order to solve this problem, the present disclosure is intended to propose a new method for configuring neuromorphic hardware and the point to be considered in an algorithm when the neural network is compiled and divided into neural network groups suitable for neuromorphic hardware.

Figure 2:
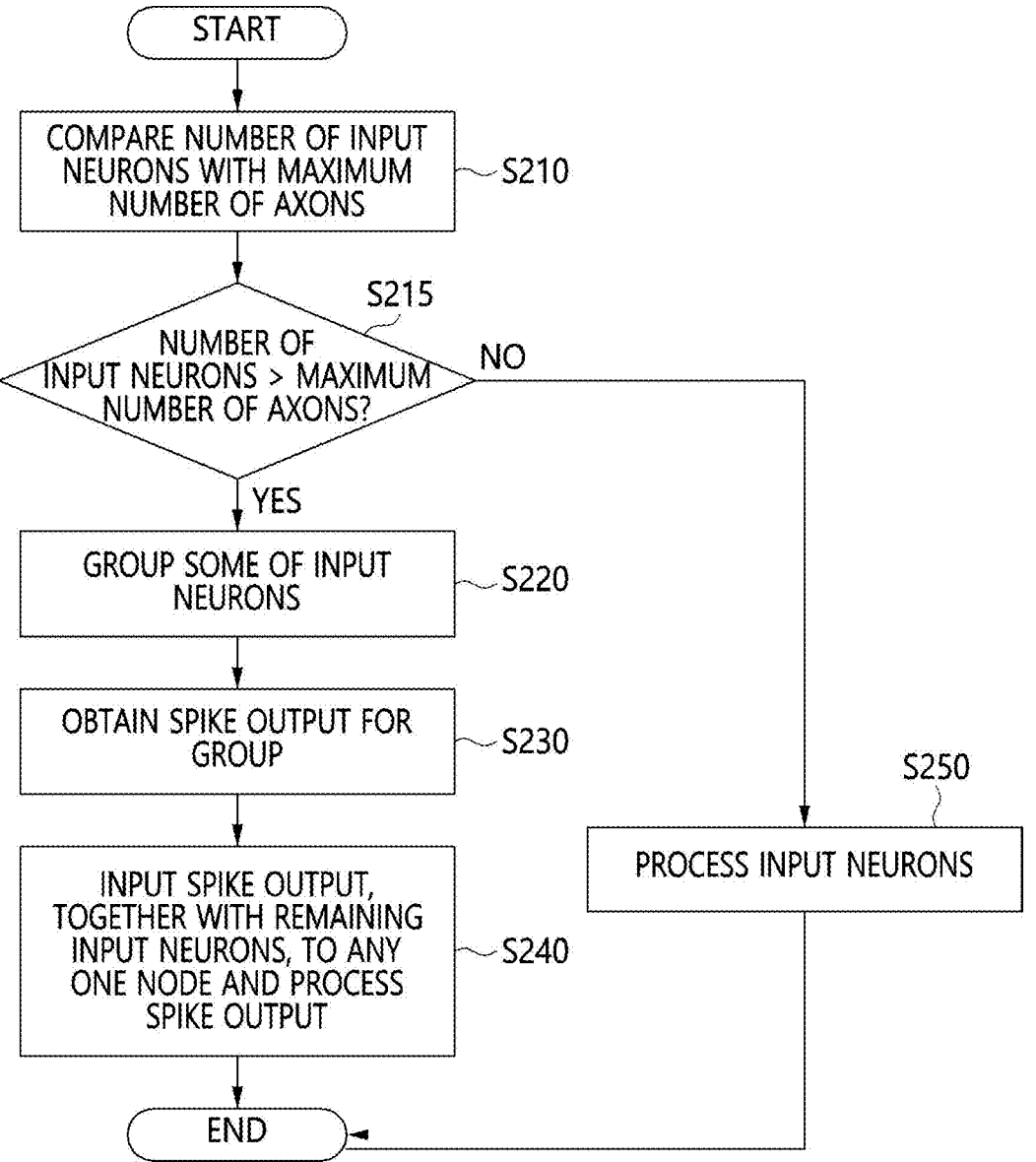
FIG. 2 is an operation flowchart illustrating a crossbar-based neuromorphic computing method capable of processing large input neurons according to an embodiment.

FIG. 2 is an operation flowchart illustrating a crossbar-based neuromorphic computing method capable of processing large input neurons according to an embodiment of the present disclosure.

Referring to FIG. 2, the crossbar-based neuromorphic computing method capable of processing large input neurons according to the embodiment of the present disclosure compares the maximum number of axons, in which the size of the crossbar of a hardware-based node is considered, with the number of input neurons at step S210.

Here, the term "maximum number of axons" refers to the maximum number of neuron input values that can be input to one node.

Further, the crossbar-based neuromorphic computing method capable of processing large input neurons according to the embodiment of the present disclosure determines whether the number of input neurons is greater than the maximum number of axons at step S215, and when the number of input neurons is found to exceed the maximum number of axons, groups some of the input neurons in consideration of the maximum number of axons at step S220.

Here, the corresponding group may be generated such that the sum of the number of the remaining input neurons that are not included in the group and the number of input neurons included in the group does not exceed the maximum number of axons.

Figure 3:
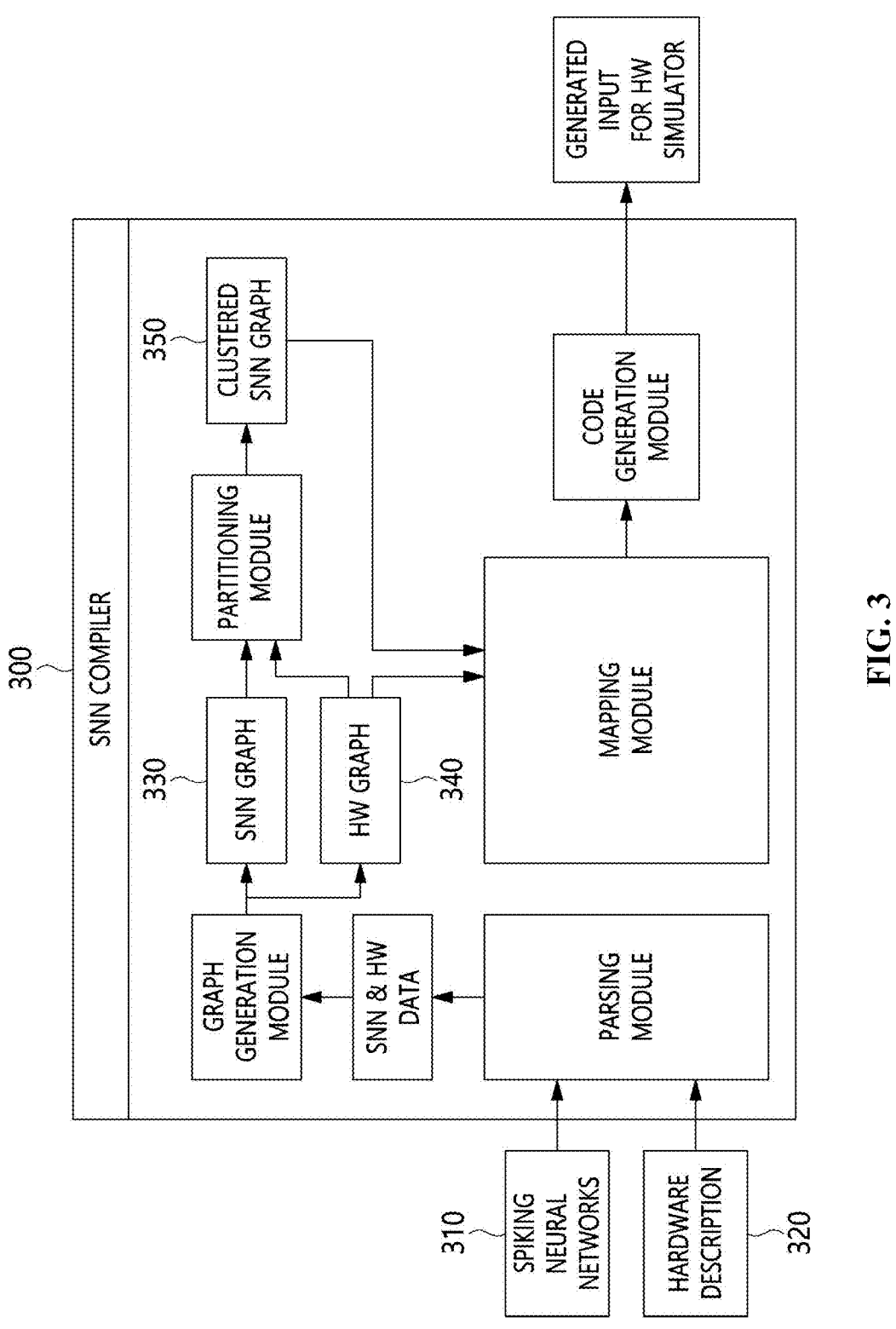
FIG. 3 is a diagram illustrating an example of a neural network compile process according to the present disclosure.

For example, referring to FIG. 3, when neural networks (e.g., spiking neural networks: SNN) 310 and information 320 about hardware to be used (i.e., hardware description 320) are input to a neural network compiler 300 according to the present disclosure, the neural network compiler 300 generates a neural network group (SNN graph) 330 and a hardware graph (HW graph) 340 using the input data.

Here, the neural network (SSN) graph 330 may be reconfigured through division into small groups, and respective clustered neural network graphs 350 may be divided into forms that can be allocated to hardware nodes.

If the number of axons corresponding to one neuron is greater than the number of axons that can be received as input by the physical crossbar, a procedure for dividing axons into small groups that can be allocated to hardware is required.

In this case, at the mapping step using the mapping module illustrated in FIG. 3, a node which is most suitable for processing of each small group may be calculated, and thus the hardware node to be used may be determined.

Furthermore, at the last step, a result may be created and output in the form of code that can be executed in hardware.

In this way, at the step in which the neural network is divided into small groups, grouping needs to be performed in consideration of hardware features. That is, in the case of hardware nodes constituting a crossbar-based neuromorphic computing system, there is a limitation in the number of input values (axons) of neurons that can be input to one hardware node due to the limited size of a crossbar. Therefore, grouping may be performed in consideration of this limitation.

Also, the crossbar-based neuromorphic computing method capable of processing large input neurons according to an embodiment of the present disclosure obtains a spike output for the generated group at step S230.

Here, the spike output may be a value corresponding to the sum of respective spikes for input neurons included in the corresponding group.

Further, the crossbar-based neuromorphic computing method capable of processing large input neurons according to an embodiment of the present disclosure inputs the spike output, together with the remaining input neurons, which are not included in the group, to any one node, and then processes the spike output at step S240.

Figure 4:
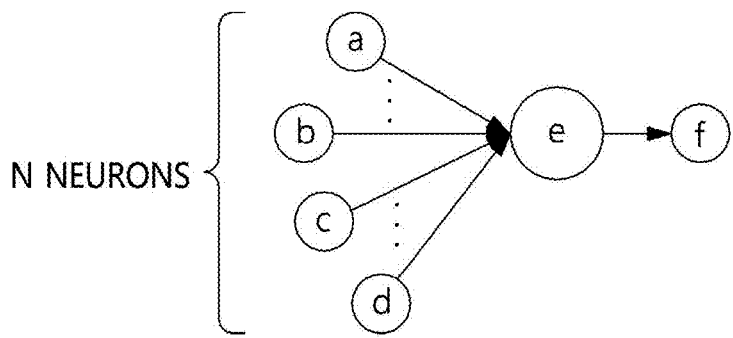
FIG. 4 is a diagram illustrating an example of an existing scheme for allocating neural networks (SNN) to a node.

For example, FIG. 4 is a diagram illustrating an example of an existing scheme for allocating neural networks (Spiking Neural Network: SNN) to a node, and FIG. 5 is a diagram illustrating an example in which neural networks (SNN) are divided into groups and are allocated to nodes according to the present disclosure.

As illustrated in FIG. 4, the number of input neurons K connected to neuron e (=node e) is greater than the maximum number of inputs M (i.e., the maximum number of axons) of the crossbar, as shown in FIG. 1, the corresponding neuron cannot be allocated to the crossbar of the node.

Figure 5:
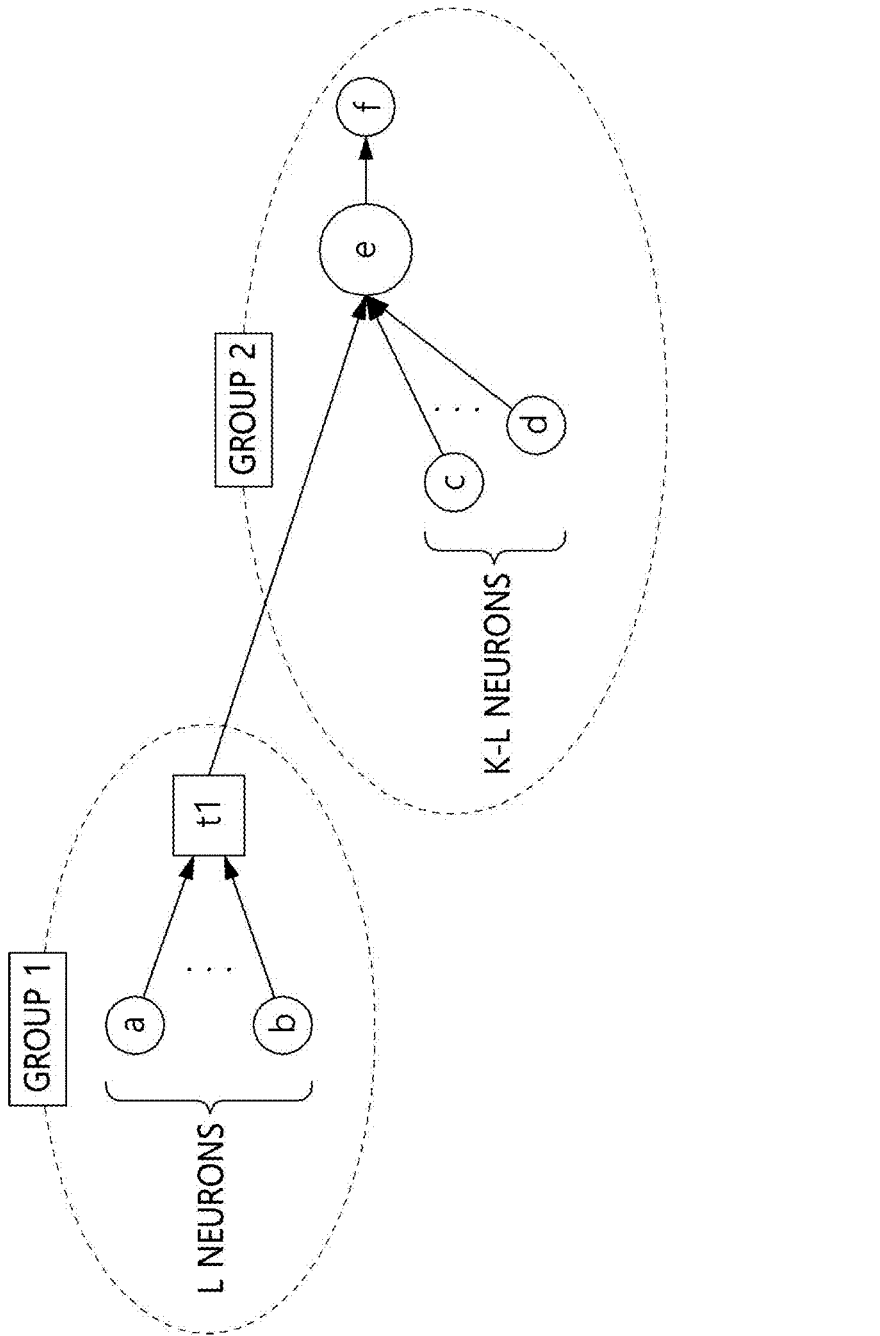
FIG. 5 is a diagram illustrating an example in which neural networks (SNN) are divided into groups and are allocated to nodes according to the present disclosure.

Therefore, as shown in FIG. 5, the present disclosure may be operated in such a way that some (a and b) of input neurons may be divided and grouped into Group 1, and the sum of spike values obtained by processing Group 1 at neuron L (node L) is gathered at intermediate value t1, and is transferred to neuron e in which Group 2 composed of the remaining input neurons is present.

Here, the spike output may be transmitted to any one node through a bypass path which does not pass through an input buffer or an output buffer in the node.

Here, the spike output may be an intermediate value, obtained by processing the input nodes included in the group, by an additional node connected to the one node through the router, and may be transferred to the crossbar of the one node through the router.

Figure 6:
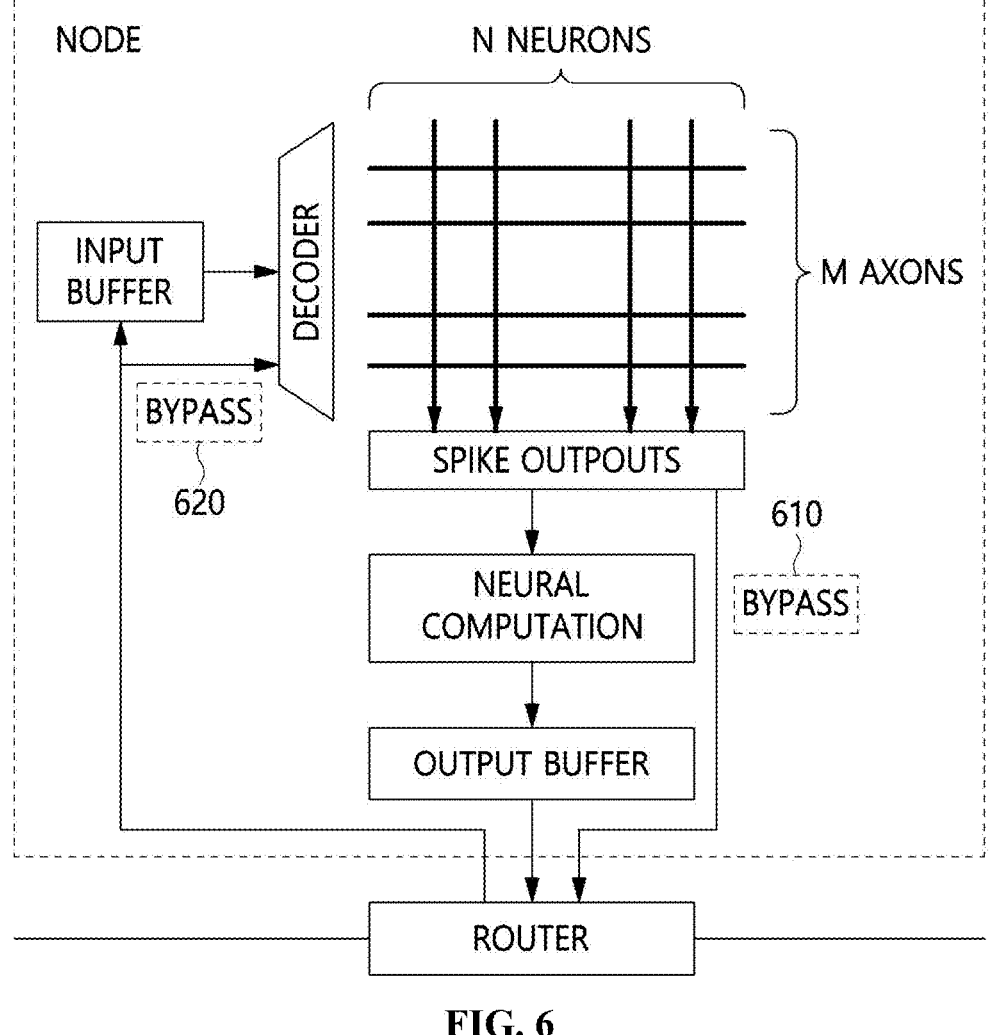
FIG. 6 is a diagram illustrating an example of the configuration of a hardware-based node according to the present disclosure.

For example, referring to FIG. 6, a neuromorphic hardware node according to an embodiment of the present disclosure may correspond to a structure in which, unlike a node used in the existing scheme, bypass paths 610 and 620 are added to respective portions corresponding to the input and output of the crossbar and input and output are immediately exchanged with a router.

Therefore, execution schemes by the node according to the embodiment of the present disclosure may be divided into two types.

First type is the case where the number of input neurons does not exceed the maximum number of axons and generation of small groups of a normal neural network is performed. In this case, the bypass paths 610 and 620 illustrated in FIG. 6 are not used.

That is, in the first type, the input buffer directly transfers an input neuron to the crossbar in each SNN cycle. When a spike occurs while the input neuron goes through internal computation, the spike may be stored in the output buffer, and may then be transferred to an additional external node through the router.

However, when the number of input neurons exceeds the maximum number of axons, in other words, when the maximum axon capacity of the crossbar is exceeded and then generated small groups of the neural network are processed, the node may be executed in the second type in which the bypass paths 610 and 620 of FIG. 6 are used.

Generally, in the neural network, input is transferred to one neuron and then processed. Accordingly, input neurons input to the node must also be processed through the same SNN cycle. In other words, Group 1 and Group 2 illustrated in FIG. 5 must be processed together in one SNN cycle.

For this, spike output t1, generated by processing Group1, may be immediately moved to the router through the bypass path 610, without being gathered with the spike outputs illustrated in FIG. 6 and going through neural computation, output buffer, etc., and may then be transferred to node K-L (=neuron K-L) to which Group2 is allocated. Therefore, at node K-L (=neuron K-L), t1 that arrives through the router may be immediately transferred to the crossbar through the bypass path 620 without passing through the input buffer.

By means of this procedure, Group1 and Group2 may be calculated using only one SNN cycle. That is, when t1 and input neurons c and d are gathered at node K-L (=neuron K-L), computation at node e (=neuron e) is processed, and whether a spike occurs in the corresponding neuron may be calculated.

Further, although not illustrated in FIG. 2, the crossbar-based neuromorphic computing method capable of processing large input neurons according to the embodiment of the present disclosure determines any one node and an additional node in consideration of information of each of multiple nodes constituting the neuromorphic computing system.

Further, in the crossbar-based neuromorphic computing method capable of processing large input neurons according to the embodiment of the present disclosure, when it is determined at step S215 that the number of input neurons does not exceed the maximum number of axons, the input neurons may be transferred to and processed by the crossbar of the node, and thus whether a spike occurs may be calculated at step S250.

By means of the crossbar-based neuromorphic computing method capable of processing large input neurons according to the embodiment of the present disclosure, correct results may be output even if an input synapse for a neuron exceeds the size of a crossbar.

Further, the neural network may be processed by associating multiple crossbars of a neuromorphic node, thus overcoming restrictions on existing neuromorphic computing hardware.

Figure 7:
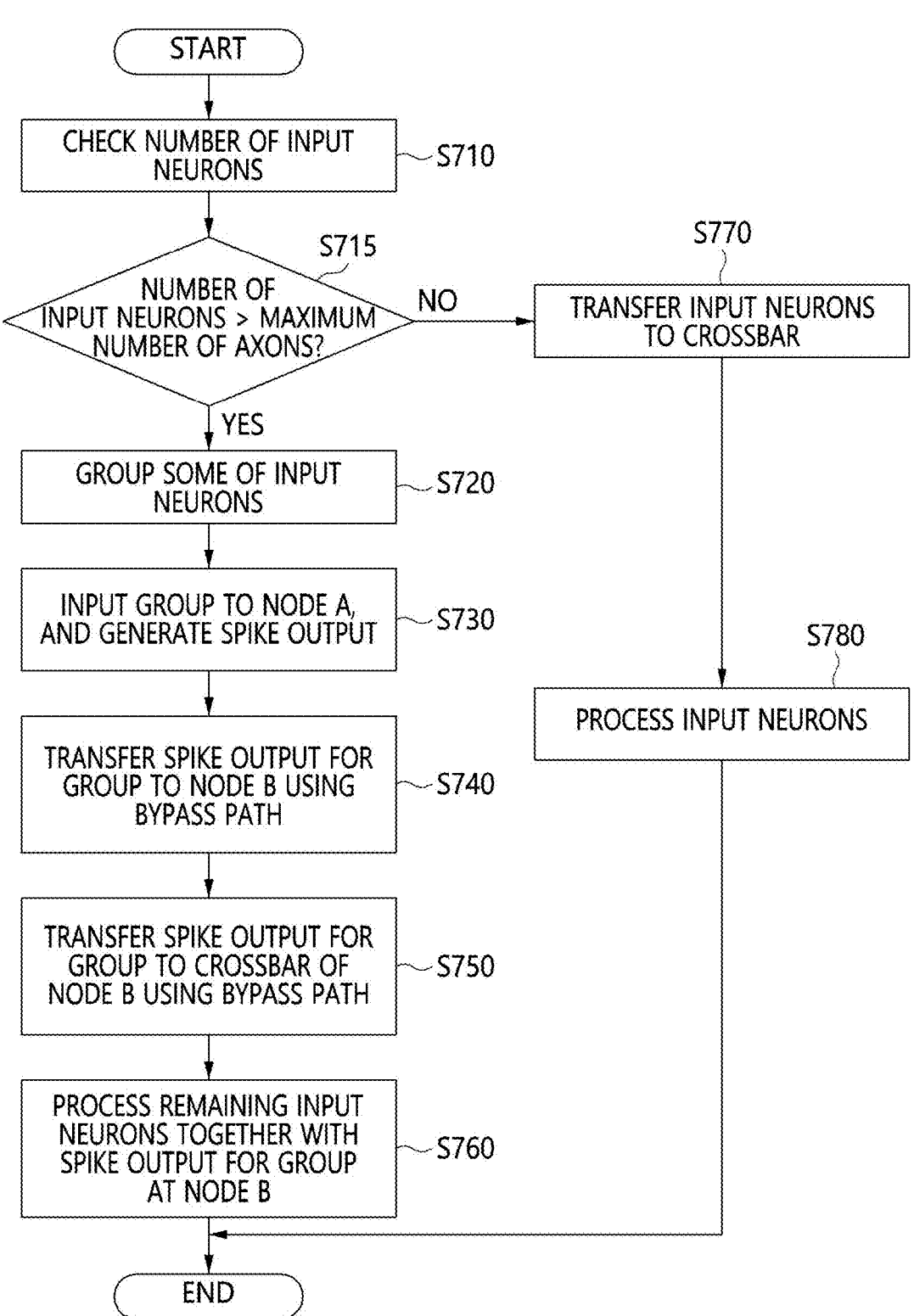
FIG. 7 is an operation flowchart illustrating in detail a neuromorphic computing method according to an embodiment of the present disclosure.

FIG. 7 is an operation flowchart illustrating in detail a neuromorphic computing method according to an embodiment of the present disclosure.

Referring to FIG. 7, the neuromorphic computing method according to the embodiment of the present disclosure may check the number of input neurons at step S710, and may determine whether the number of input neurons exceeds the maximum number of axons in which the size of the crossbar of a node is considered at step S715.

When it is determined at step S715 that the number of input neurons exceeds the maximum number of axons, some of the input neurons may be grouped in consideration of the maximum number of axons at step S720.

Thereafter, input neurons included in the corresponding group are transferred to and calculated by the crossbar of node A (=neuron A), and thus a spike output corresponding to the sum of spikes generated by the input neurons included in the group may be output at step S730.

Thereafter, the spike output may be transferred from node A to the router through a bypass path which does not pass through an output buffer, and the spike output may be transferred to node B to which the remaining input neurons, which are not included in the group, are allocated through the router at step S740.

Thereafter, the spike output, transferred from node B to the router through the bypass path which does not pass through the input buffer, may be input to the crossbar of node B at step S750. Whether a spike occurs in the neuron corresponding to node B may be determined by calculating and processing all values transferred to the crossbar of node B at step S760.

Further, when it is determined at step S715 that the number of input neurons does not exceed the maximum number of axons, whether a spike occurs may be calculated by transferring and processing the input neurons to the crossbar of the node at steps S770 and S780.

Figure 8:
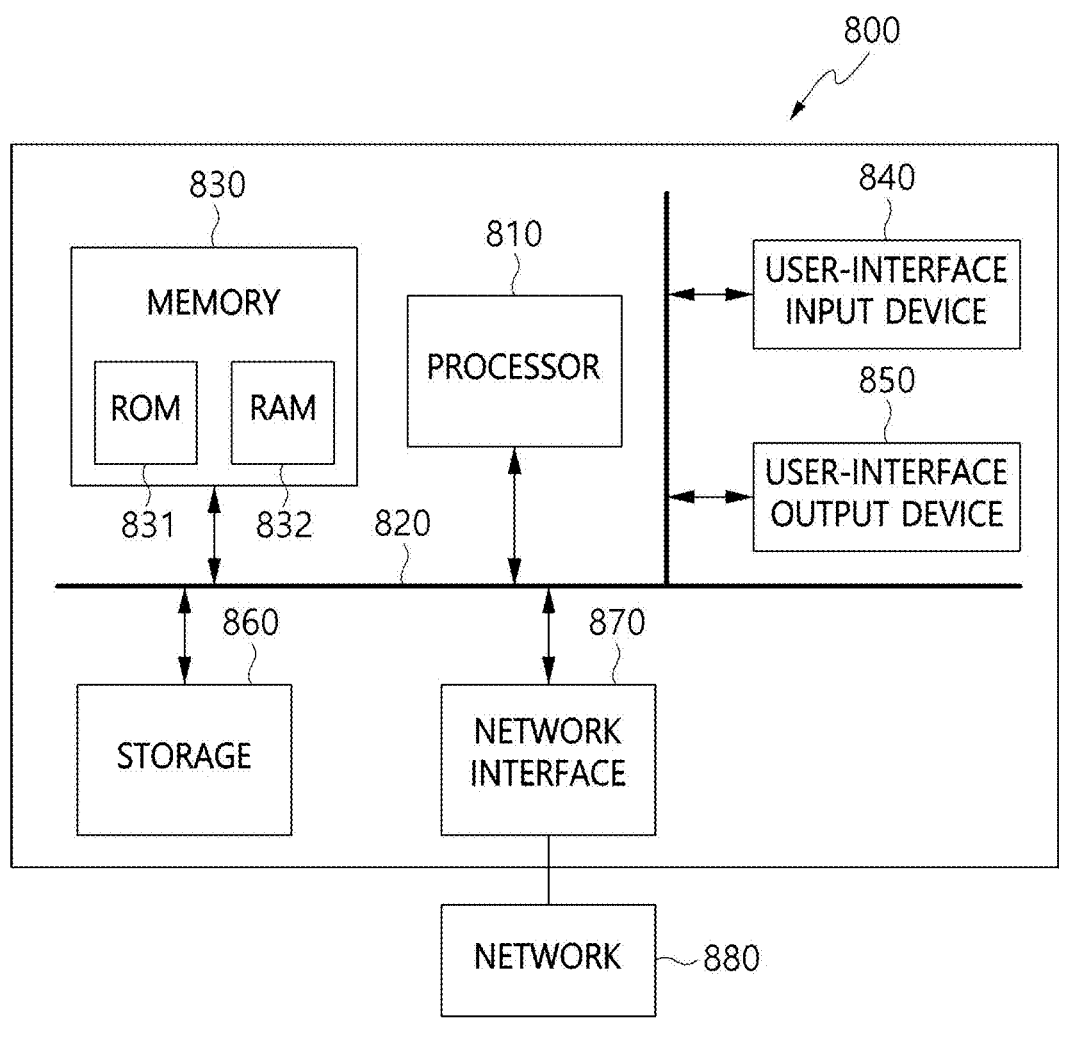
FIG. 8 is a diagram illustrating a crossbar-based neuromorphic computing apparatus capable of processing large input neurons according to an embodiment of the present disclosure.

FIG. 8 is a diagram illustrating a crossbar-based neuromorphic computing apparatus capable of processing large input neurons according to an embodiment of the present disclosure.

The crossbar-based neuromorphic computing apparatus capable of processing large input neurons according to the embodiment of the present disclosure may be implemented in a computer system such as a computer-readable storage medium. As illustrated in FIG. 8, a computer system 800 may include one or more processors 810, memory 830, a user interface input device 840, a user interface output device 850, and storage 860, which communicate with each other through a bus 820. The computer system 800 may further include a network interface 870 connected to a network 880. Each processor 810 may be a Central Processing Unit (CPU) or a semiconductor device for executing processing instructions stored in the memory 830 or the storage 860. Each of the memory 830 and the storage 860 may be any of various types of volatile or nonvolatile storage media. For example, the memory 830 may include Read-Only Memory (ROM) 831 or Random Access Memory (RAM) 832.

Therefore, the embodiment of the present disclosure may be implemented as a non-transitory computer-readable medium in which a computer-implemented method or computer-executable instructions are stored. When the computer-readable instructions are executed by the processor, the computer-readable instructions may perform the method according to at least one aspect of the present disclosure.

The processor 810 compares the maximum number of axons, in which the size of the crossbar of a hardware-based node is considered, with the number of input neurons.

Further, when the number of input neurons exceeds the maximum number of axons, the processor 810 may group some of the input neurons in consideration of the maximum number of axons.

Here, the corresponding group may be generated such that the sum of the number of the remaining input neurons that are not included in the group and the number of input neurons included in the group does not exceed the maximum number of axons.

Furthermore, the processor 810 may obtain a spike output for the generated group.

Here, the spike output may be a value corresponding to the sum of respective spikes for input neurons included in the corresponding group.

Furthermore, the processor 810 may input the spike output, together with the remaining input neurons, which are not included in the group, to any one node, and may then process the spike output.

Here, the spike output may be transmitted to any one node through a bypass path which does not pass through an input buffer or an output buffer in the node.

Here, the spike output may be an intermediate value, obtained by processing the input nodes included in the group, by an additional node connected to the one node through the router, and may be transferred to the crossbar of the one node through the router.

Furthermore, the processor 810 may determine any one node and an additional node in consideration of information of each of multiple nodes constituting the neuromorphic computing system.

The memory 830 may store the input neurons and the spike output.

By means of the crossbar-based neuromorphic computing apparatus capable of processing large input neurons, correct results may be output even if an input synapse for a neuron exceeds the size of a crossbar.

Further, the neural network may be processed by associating multiple crossbars of a neuromorphic node, thus overcoming restrictions on existing neuromorphic computing hardware.

According to the present disclosure, there can be provided neuromorphic hardware configuration, which can output correct results even if an input synapse for a neuron exceeds the size of a crossbar.

Further, the present disclosure may process a neural network by associating multiple crossbars of a neuromorphic node, thus overcoming restrictions on existing neuromorphic computing hardware.

Furthermore, the present disclosure may process a neuron in which large inputs are generated.

As described above, in the crossbar-based neuromorphic computing apparatus capable of processing large input neurons and the method using the crossbar-based neuromorphic computing apparatus according to the present disclosure, the configurations and schemes in the above-described embodiments are not limitedly applied, and some or all of the above embodiments can be selectively combined and configured such that various modifications are possible.

What is claimed is:

1. A neuromorphic computing method in a crossbar-based neuromorphic computing system, the neuromorphic computing method comprising:

comparing a maximum number of axons in which a size of a crossbar of a hardware-based a first node is considered with a number of input neurons;

when the number of input neurons exceeds the maximum number of axons, grouping some of input neurons in consideration of the maximum number of axons;

obtaining a spike output of the first node using a generated group as input; and inputting, to a second node, the spike output together with remaining input neurons that are not included in the group and not processed, and processing them in the second node, wherein the spike output is transmitted to the second node through a bypass path without passing through an output buffer of the first node or an input buffer of the second node.

2. The neuromorphic computing method of claim 1, wherein the spike output corresponds to an intermediate value obtained by processing an input node included in the group in the first node, and is transferred to a crossbar of the second node through a router.

3. The neuromorphic computing method of claim 1, wherein the spike output corresponds to a value obtained by summing spikes for respective input neurons included in the group.

4. The neuromorphic computing method of claim 2, further comprising:

selecting the second node to which the spike output is input and the first node that processes the grouped input neurons in consideration of information of each of multiple nodes constituting the neuromorphic computing system.

5. The neuromorphic computing method of claim 1, wherein the group is generated such that a value obtained by adding a number of remaining input neurons, which are not included in the group, to a number of input neurons included in the group does not exceed the maximum number of axons.

6. A neuromorphic computing apparatus, comprising:

a processor for comparing a maximum number of axons in which a size of a crossbar of a hardware-based a first node is considered with a number of input neurons, when the number of input neurons exceeds the maximum number of axons, grouping some of input neurons in consideration of the maximum number of axons, obtaining a spike output of the first node using a generated group as input, inputting the spike output, together with remaining input neurons that are not included in the group and not processed, and processing the them in a second node; and a memory for storing the input neurons and the spike output, wherein the spike output is transmitted to the second node through a bypass path without passing through an output buffer of the first node or an input buffer of the second node.

7. The neuromorphic computing apparatus of claim 6, wherein the spike output corresponds to an intermediate value obtained by processing an input node included in the group in the first node, and is transferred to a crossbar of the second node through a router.

8. The neuromorphic computing apparatus of claim 6, wherein the processor is configured to generate the spike output that corresponds to a value obtained by summing spikes for respective input neurons included in the group.

9. The neuromorphic computing apparatus of claim 7, wherein the processor selects the second node to which the spike output is input and the first node that processes the grouped input neurons in consideration of information of each of multiple nodes constituting the neuromorphic computing system.

10. The neuromorphic computing apparatus of claim 6, wherein the group is generated such that a value obtained by adding a number of remaining input neurons, which are not included in the group, to a number of input neurons included in the group does not exceed the maximum number of axons.

* * * * *